United States Patent
Wolf et al.

[19]

[11] Patent Number: 5,892,770
[45] Date of Patent: Apr. 6, 1999

[54] PROCESS FOR CONVERTING DIGITAL DATA STREAMS HAVING AN ATM CELL STRUCTURE

[75] Inventors: Andreas Wolf; Hans-Werner Arweiler, both of Berlin, Germany

[73] Assignee: Tektronix, Inc., Wilsonville, Oreg.

[21] Appl. No.: 545,687

[22] PCT Filed: Apr. 15, 1994

[86] PCT No.: PCT/DE94/00427

§ 371 Date: Feb. 22, 1996

§ 102(e) Date: Feb. 22, 1996

[87] PCT Pub. No.: WO94/24787

PCT Pub. Date: Oct. 27, 1994

[30] Foreign Application Priority Data

Apr. 16, 1993 [DE] Germany .......................... 43 15 420.4

[51] Int. Cl.[6] .................. H04J 3/16; H04J 3/22
[52] U.S. Cl. .......................... 370/468; 370/474; 370/471; 370/395; 370/905
[58] Field of Search ..................... 370/474, 466, 370/471, 468, 395, 394, 469, 253, 905, 470

[56] References Cited

U.S. PATENT DOCUMENTS 4,612,636  9/1986  Grover et al. .......................... 370/466

FOREIGN PATENT DOCUMENTS 0 468 818  1/1992  European Pat. Off. .
40 12 850  10/1991  Germany .
41 21 863  1/1993  Germany .

OTHER PUBLICATIONS

Supercomm/ICC 1992, vol. 1 of 4, 14 Jun. 1992, Chicago, pp. 281–285, H. Uematasu et al.: *STM Signal Transfer Techniques in ATM Networks*.

Grundlagen Der Vermittlungstechnik, G. Siegmund, Decker–Verlag, Heidelberg, DE, 1992, pp. 377–389.

Hewlett Packhard HP 75 000 Catalog: *The First Total Testing Solution for Broadband*.

ATM Test System ME3505A, 1990, Anritsu Corporation, Tokyo, Japan.

"nts", vol. 45, No. 2, 1992, Henri Tobiet: *Modulare Testarchitektur für breitbandige ATM–Netze*.

Pulstechnik, vol. II, Springer Verlag, Berlin, DE, 1984, E. Hölzer et al.

CCITT Recommendations, vol. 3, Fascicle III.3, Digital Networks Transmission Systems and Multiplexing Equipment. Rec. G.702, Rec. G.735–G.741.

CCITT Temp.Doc. 21 (XVIII), Title *Part II of the Report of Working Party XVIII/7 meeting (Digital Hierarchies)*, Geneva 19–29 Jan. 1993 with draft recommendations G.7zz and G.7xx.

Nachrichten–Messtechnix, Springer–Verlag, Berlin, DE, 1981, E. Schuon et al., pp. 236–237.

*Primary Examiner*—Wellington Chin
*Assistant Examiner*—Melissa Kay Carman
*Attorney, Agent, or Firm*—Richard L. Mayer; Thomas F. Lenihan

[57] ABSTRACT

A first data stream for a first data transmission system having a first data rate contains ATM data cells and structural data, which are distributed as spaced apart data in accordance with a specified instruction and are assigned to a section including in each case a plurality of ATM data cells. While retaining its ATM data cell format, the first data stream is converted into a second data stream containing only ATM data cells for a second data transmission system having a second data rate which is higher than the first data rate. The structural data are thereby selected (or picked out) from the first data stream and are input into a marked structural cell having the ATM cell format, for the section. The structural cell is inserted into the second data stream to partially fill an unoccupied section resulting from the differing data rates.

14 Claims, 4 Drawing Sheets

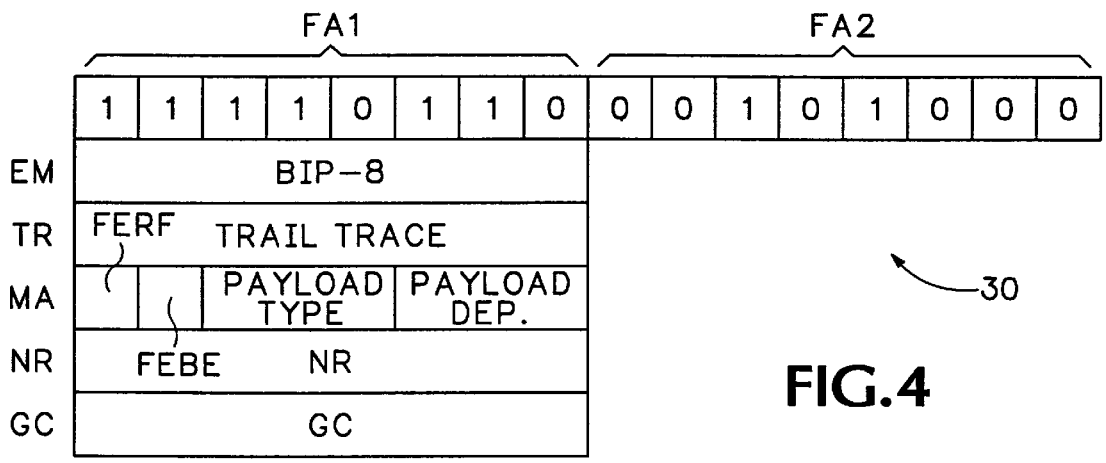
FIG. 4
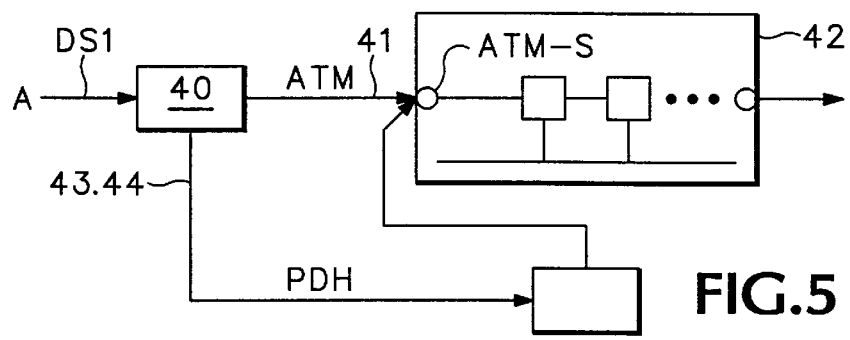
FIG. 5
```
PDH              MULTIPLEX
 2 MBIT/S    ×    CA. 70    <   155 MBIT/S
34 MBIT/S    ×       4      <   155 MBIT/S
140 MBIT/S   ×       1      <   155 MBIT/S
```
FIG. 8
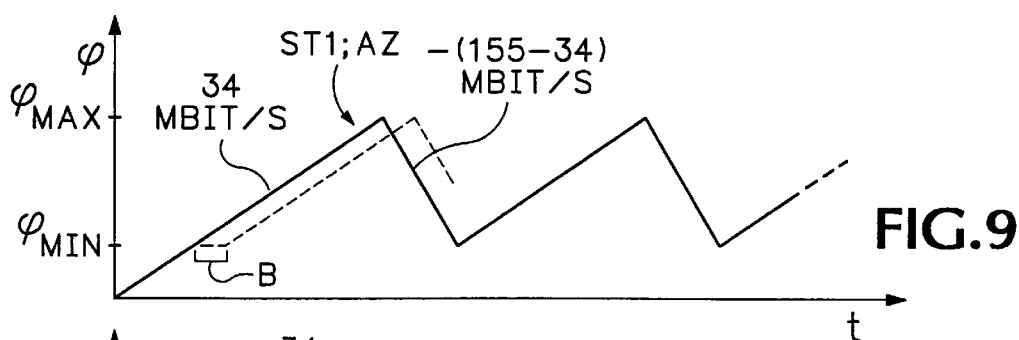
FIG. 9
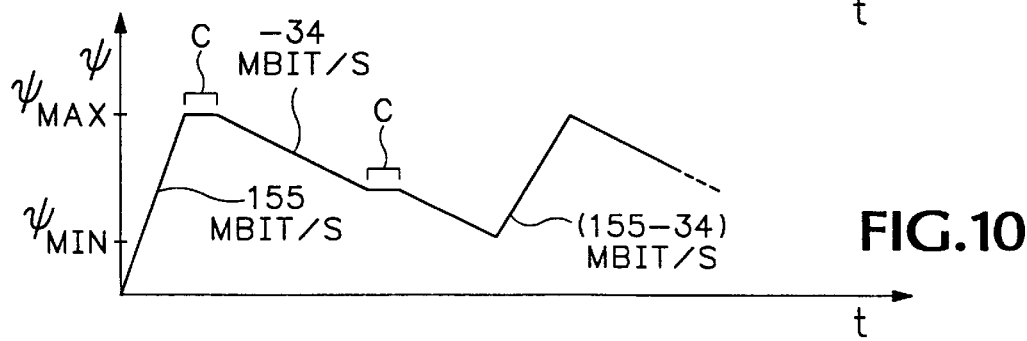
FIG. 10

PROCESS FOR CONVERTING DIGITAL DATA STREAMS HAVING AN ATM CELL STRUCTURE

BACKGROUND OF THE INVENTION

Data transmission technology has been implemented which uses different dataorganization structures for data streams. An organizational structure that is becoming more and more prevalent in conjunction with the increasingly widespread broadband ISDN (B-ISDN) is the Asynchronous Transfer Mode (ATM), in which the data cells of the data stream are structured in the ATM cell format (referred to in the following as: ATM data cells). The fundamentals of the Asynchronous Transfer Mode (ATM) are described, for example, in "Grundlagen der Vermittlungstechnik" [Fundamentals of Switching Technology], by G. Siegmund, Decker Publishers, 1992, pp. 377–389 and in the German Laid Open Document No. A1-40 12 850. The ATM data cells have a header used, inter alia, for addressing, identification, and testing, and a payload to which useful data can be allocated. Measuring and testing devices are known (e.g., from the catalog "The First Total Testing Solution for Broadband", No. 5091-7305E, 1993, of the firm HEWLETT PACKARD with the designation HP 75 000 or from the catalog "ATM Test System ME3505A", No. ME 3505A-1, 1990, of the firm ANRITSU CORP., TOKYO, JAPAN), which test data transmission and/or data processing systems, whose data streams are comprised exclusively of ATM data cells (referred to in the following as pure ATM data cell stream). These devices have an interface, via which the ATM data cells are read into an input stage of the measuring or testing device for further evaluation and, if indicated, can be output, as needed, together with measuring results via an output stage of the measuring device. It is customary for the input stage and the output stage to be linked with one another via a so-called "local bus" to exchange data.

From "ntz", Vol. 45, 1992, issue 2, p. 92, a generator-analyzer application for ATM data cells is known, whereby an interface module accesses a B-ISDN transmission line in order to analyze or generate a data stream of two ATM data cells. The interface module thereby separates call signals from the data signals. Subsequently, only the ATM cell-structured data signals are analyzed by an external device (e.g. a logic analyzer), while a further processing, evaluation and/or manipulation of the separated call signals and/or of control signals are not mentioned and apparently are not possible.

Already installed data transmission or data processing systems work with so-called PDH (plesiochronous digital hierarchy) transmission processes, which do not use any ATM data cells, but rather data streams. Besides the useful data, the data streams additionally contain frame-forming structural data. With respect to the term "plesiochronous", reference is made to "Pulstechnik" [Pulse Technology], E. H ölzer/ H. Holzwarth, Springer Publishers, 1984, page 312. In this publication two signals are described as being "plesiochronous" with respect to one another when their clock pulse frequencies deviate only slightly from one another within specified limits. The fundamentals and bit rates of hierarchical processes known per se are described in CCITT Rec., vol. III, fascicle III.3, G.702. The structural data are allocated in each case to a section of the data stream consisting of a plurality of data and are distributed in accordance with a specified instruction as spaced apart data (or cyclically interleaved data) in the data stream.

An increasing need is expected for installed systems to be operated with a data stream containing data cells in a PDH (Plesiochronous Digital Hierarchy) frame. In such a data stream, the structural data are distributed on a byte by byte basis in the stream of the ATM data cells. The structural data (PDH frame information) interrupt and divide the ATM cells (for example within the payloads of the ATM data cells). Because the structural data contained in the data stream are spaced apart, a data stream of this type is not suited for direct testing by means of a device designed for pure ATM data streams. In accordance with CCITT Rec. G.7xx and G.7zz or ETSI DE/TM-3007, 2, 34 or 140 mbit/s are used as data transmission rates (data rates or bit rates) in the case of PDH-framed ATM data cell streams. On the other hand, a data rate of 155 mbit/s is recommended for the pure ATM data stream.

To be able to further process the structural data and the measuring results obtained from this data in an existing measuring device, which, as described at the outset, is designed for pure ATM data cells, it would be conceivable, in principle, to feed this data into the local bus of the measuring device. This would be comparatively expensive, however, since in the case of the measuring device, the bus structure would have to be altered accordingly, which can lead to conflicts with measuring modules contained in the measuring device.

The German Laid Open Document No. A1-41 21 863 discloses a process for operating a buffer memory, in the case of which plesiochronous digital signals read in on the input side are adapted to a data rate required on the output side, in that filler or stuffing (bit rate justification) bits are inserted, as needed, in place of data bits at defined positions of the emitted, non-cell-structured data stream. Details about the contents of the filler or stuffing bits are not included in the German Laid Open Document No. A1-41 29 863.

SUMMARY OF THE INVENTION

The present invention renders it possible, using a simple means, for inputting, further processing, evaluation, manipulation and/or outputting of the structural data of a data stream using a measuring device suited for processing pure ATM data cell streams. In performing these functions, the chronological sequence of the ATM data cells may be fundamentally retained.

A first data stream for a first data transmission system having a first data rate contains ATM data cells and structural data, which are distributed as spaced apart data in accordance with a specified instruction and are assigned to a section including in each case a plurality of ATM data cells. While retaining its ATM data cell format, the first data stream is converted into a second data stream containing only ATM data cells for a second data transmission system having a second data rate which is higher than the first data rate. The structural data are thereby selected (or picked out) from the first data stream and are input into a marked structural cell having the ATM cell format, for the section. The structural cell is inserted into the second data stream to partially fill an unoccupied section resulting from the differing data rates.

In an embodiment of the present invention, digital data streams having an ATM cell structure may be converted by converting a first data stream (DS1) for a first data transmission system (DU1) having a first data transmission rate (data rate), while retaining the chronological sequence of its ATM data cells, into a second data stream (DS2) for a second data transmission system (DU2) having a second data transmission rate which is higher than the first data transmission rate. The first data stream (DS1) contains data cells (2, 3, 4)

in the ATM cell format (ATM data cells) and structural data (10, 11, 12), the structural data each assigned to a section (13) including a plurality of ATM data cells (2, 3, 4) and distributed according to a specified instruction in the first data stream (DS1). The second data stream (DS2) contains only cells in the ATM cell format. The structural data (10, 11, 12) are selected (or picked out) from the first data stream (DS1) and are input into a marked or markable structural cell (ST) having the ATM cell format, for the assigned section (13). The specific structural cell (ST) is inserted into the second data stream (DS2) for at least partial filling of an unoccupied section, which is formed as a result of the different data rates.

In an alternative embodiment, the structural data are evaluated in view of specifiable criteria, the evaluation result is also input into the specific structural cell (ST). In another alternative embodiment, the ATM data cells (2, 3, 4) of the first data stream (DS1) are input into a cell memory (60) having a determined allocation level, wherein a minimum beginning allocation level ($\phi_{MIN}$) is designed so that until a next structural cell (ST1 . . . ST4) is inserted into the second data stream (DS2), a permissible minimum allocation level ($\phi_{MIN}$) is not undershot, and that, except for structural cell(s) (ST1 . . . ST4), equalization cells (AZ) are inserted, as needed, for so long into the second data stream (DS) until the allocation level ($\phi$) again reaches at least the minimum beginning allocation level ($\phi_{MAX}$).

In another embodiment of the present invention, digital data streams having an ATM cell structure are converted by forming a first data stream (DS1) for a first data transmission system (DU1) having a first data transmission rate (data rate) from a second data stream (DS2) for a second data transmission system (DU2) having a second data transmission rate which is higher than the first data transmission rate, while retaining the chronological sequence of ATM data cells of the second data stream. The first data stream (DS1) contains data cells in the ATM cell format (ATM data cells) and structural data, the structural data being each assigned to a section (13) including a plurality of ATM data cells (2, 3, 4) and being distributed according to a specified instruction in the first data stream (DS1). The second data stream (DS2) contains only cells in the ATM cell format. The structural data for the first data stream (DS1), which is allocated in each case by sections, are input into marked or markable structural cells (ST) and are manipulated, as needed. The structural cells (ST) are inserted into the second data stream (DS2) for at least a partial filling of unoccupied sections created as a result of the different data rates. The structural data are drawn from the structural cells (ST) and are distributed in the first data stream (DS1) in accordance with the specified instruction.

In an alternative embodiment, the data of the structural cells (ST) are manipulated to selectively change the structural data. In another alternative embodiment, the ATM data cells of the second data stream (DS2) are input into a cell memory (73), and the beginning allocation level ($\phi_{MIN}$) and the capacity of the cell memory (73) are designed (rated) so that, until the next structural cell (ST) and/or possibly equalization cell(s) (AZ) appear in each case, the exceeding of a highest allocation level is avoided ($\phi_{MAX}$). In another embodiment of the present invention, the first data stream (DS1) is formed in the time-division multiplex comprised of a plurality of partial data streams (DST1 . . . DST4), a number (n) of the partial data streams (DST1 . . . DST4) being calculated so that the sum of the data rates of the partial data streams (DST1 . . . DST4), with the addition of each partial data stream (DST1 . . . DST4) of individually assigned structural cells (ST1 . . . ST4), is smaller than or equal to the second data rate. According to another embodiment, remaining unoccupied sections in the second data stream (DS2) are filled by equalization cells (AZ), which are formed by multiplying the specific structural cell (ST). In another embodiment, the structural data can represent a PDH frame.

One important advantage of the present invention consists in that the chronological sequence of the ATM data cells contained in the first data stream or constituting the first data stream will be retained in comparison with the second data stream, making subsequent evaluations or tests easily possible. Since the cell sequence per unit of time, and thus, the data rate of the first data stream, is less than that of the second data stream, equalization cells are inserted at defined positions into the second data stream, in order to render possible a continuous, synchronous conversion. The data transmission systems can also be components of data processing or data manipulation systems, such as measuring devices.

The present invention integrates the structural data of the first or for the first data stream into the second data stream using marked or markable structural cells having the ATM cell format (initially unoccupied) sections in the second data stream created as a result of the different data rates being filled in the second data stream not only, for instance, by idle cells, but by ATM data cells designed specifically for the structural data. Thus, a very elegant data exchange is possible using a measuring device suited only for pure ATM data-cell processing or using a corresponding data processing device.

The ATM data cells, by themselves, have a comparatively large payload. Therefore. in accordance with one advantageous further development of the present invention, results and/or data additionally obtained through evaluation of the structural data can be easily input into the specific structural cell to selectively change the structural data.

According to one advantageous development of the present invention, to convert the first data stream into the second data stream, the ATM data cells of the first data stream are input into a cell memory, whose allocation (occupancy) level is determined, the minimum beginning allocation level being so designed (or rated), that until a next structural cell is inserted into the second data stream, a permissible minimum allocation level is not undershot, and that, except for the structural cell(s), equalization cells are inserted, as needed, for so long into the second data stream until the allocation level again reaches at least the minimum beginning allocation level.

In a corresponding design, one advantageous refinement of a process according to the present invention provides, with respect to the conversion of the second data stream into the first data stream, that the ATM data cells of the second data stream are input into a cell memory, and that the beginning allocation level and the capacity of the cell memory are so designed (or rated) that, until the next structural cell and/or possibly equalization cell(s) appear in each case, one avoids exceeding a highest allocation level.

One further development of the present invention, which is especially advantageous with respect to transmission efficiency, provides for the first data stream to be produced in a time-division multiplex consisting of a plurality of partial data streams, the number of the partial data streams being calculated so that the sum of the data rates of the partial data streams, with the addition of each partial data stream of individually assigned structural cells, is smaller than the second or equal to the second data rate.

As mentioned at the outset, to compensate for different data rates and to synchronize the data streams, equalization cells are inserted, as needed, into the second data stream. The equalization cells can be rendered distinguishable by a special addressing in their header. One preferred embodiment of the present invention provides for the equalization cells to be formed by multiplying the structural cells to be inserted in each case, making them especially easy to recognize. In one operation of the process in the time-division multiplex described above, the equalization cells can preferably be inserted between successive structural cells.

The process according to the present invention is able to be applied quite advantageously in the case of a so-called PDH-ATM interface, the structural data in the first data stream forming the PDH frame described at the outset.

BRIEF DESCRIPTION OF THE DRAWINGS

Further advantages and features of the present invention will be described in the following written description taken in conjunction with the attached drawings.

FIG. 2, FIG. 3 and FIG. 4 illustrate PDH-framed ATM data streams.

FIG. 5 illustrates characteristics of a process according to an embodiment of the present invention.

FIG. 8 illustrates the correlation among various data rates.

FIG. 9 and FIG. 10 illustrate the allocation level of the memory systems used when carrying out the process according to an embodiment of the present invention.

DETAILED DESCRIPTION

Figure 1:
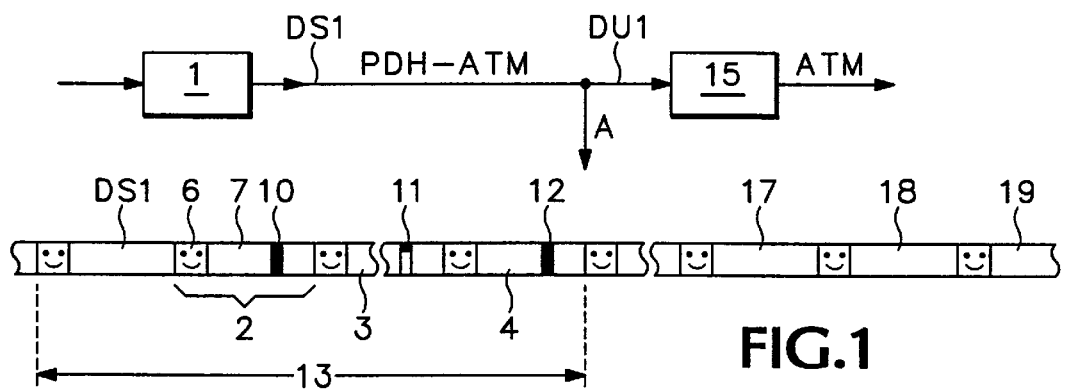
FIG. 1 illustrates one PDH-framed data stream and one pure ATM data stream in various data transmission systems.

FIG. 1 illustrates a data processing module 1, which, on the output side, emits a first data stream DS1 into a first data transmission system DÜ1 with a first data transmission rate (data rate) of 34.368 mbit/s (rounded off in the following description to 34 mbit/s; other subsequent data rate indications are also similarly rounded off in the following description). The first data stream DS1 contains data cells 2, 3 and 4, which have the ATM (Asynchronous Transfer Mode) cell format (ATM data cells). The ATM cell format provides for a header 6 and a payload 7 for the unrestricted entering of useful data. According to one specified instruction for PDH framing (e.g. specified by CCITT Rec.G.735 to G.741, vol. III, Fascicle III.3), the data stream DS1 contains spaced apart, 1-byte wide structural data 10, 11, and 12 for one section 13 of the data stream DS1, with the splitting of a few ATM data cells 2. The data stream DS1 is, therefore, described in the following as a PDH-framed ATM data cell stream (in short, as a framed data stream). A converter 15 is connected to the first data transmission system DÜ1. Converter 15 converts the data stream DS1 into a pure ATM data cell stream, which consists only of ATM data cells 17, 18 and 19 and is accessible to an evaluation by a measuring device suited for that purpose. However, information about the structural data (e.g., structural-data errors) cannot be checked in this manner, and the structural data can also not be indicated.

Therefore, an important measuring task for data transmission systems which work with framed data streams consists in acquiring (or determining) with measuring techniques, evaluating, and, if indicated, outputting also those structural data contained in the first data stream DS1 for the PDH framing.

Figure 2:
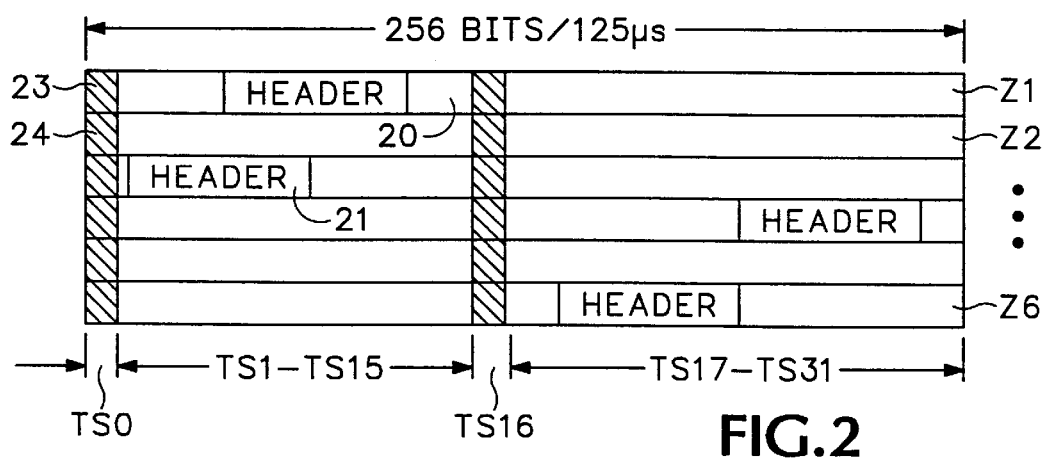
Figure 3:
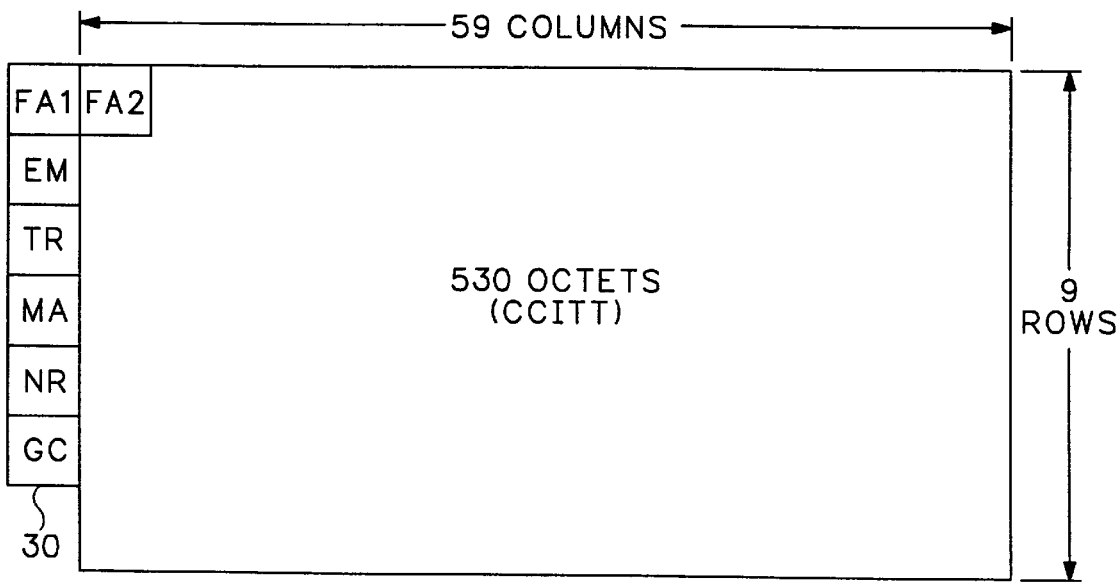

To enable a better understanding of a PDH-framed ATM data cell stream DS1, FIG. 2, FIG. 3 and FIG. 4 illustrate the structure of a corresponding PDH frame (compare CCITT.G.7zz, 2:G7xx.3). whose useful capacity or range (530 octets) is filled with ATM data cells. In this case, departing from the depiction in FIG. 1, the specific ATM data cells having a header and payload (e.g., 20, 21 in sections TS1 through TS15 and TS 17 through TS31), and the structural data (e.g. 23, 24 in section TS0) are arranged in several rows Z1 through Z6. Viewed chronologically, the beginning of row Z2 directly follows the end of row Z1, etc. Sections TS 16 can be reserved for control signals. As FIG. 3 and FIG. 4 each illustrate for a framed data stream DS1 with 34 mbit/s, corresponding sections of ATM data cells (e.g., 530 octets useful capacity) are allocated to the respective structural data 30 (designated in accordance with CCITT by FA1,FA2,EM,TR,MA,NR,GC). FIG. 4 illustrates in detail the contents of the structural data sections established in accordance with CCITT. In their header and/or payload, the ATM data cells are interrupted (broken off) from the structural data and divided.

As FIG. 5 illustrates, the data stream DS1 tapped off at point A (FIG. 1) is supplied to a converter 40, which separates the data stream DS1 according to ATM data cells, on the one hand, and structural data, on the other hand. As a result, a pure ATM data cell stream 41 is formed, which is fed directly to an interface ATM-S of a measuring or evaluating device 42 suited for ATM data cells. At the same time, the converter 40 checks and separates the structural data of the PDH frame and, on the output side, makes available the structural data 43 and measuring results 44 obtained from a comparison of the structural data 43 with specified structural data. As described in the following, the structural data 43 and the measuring results 44 are input into a structural cell 45 having an ATM cell format.

Figure 6:
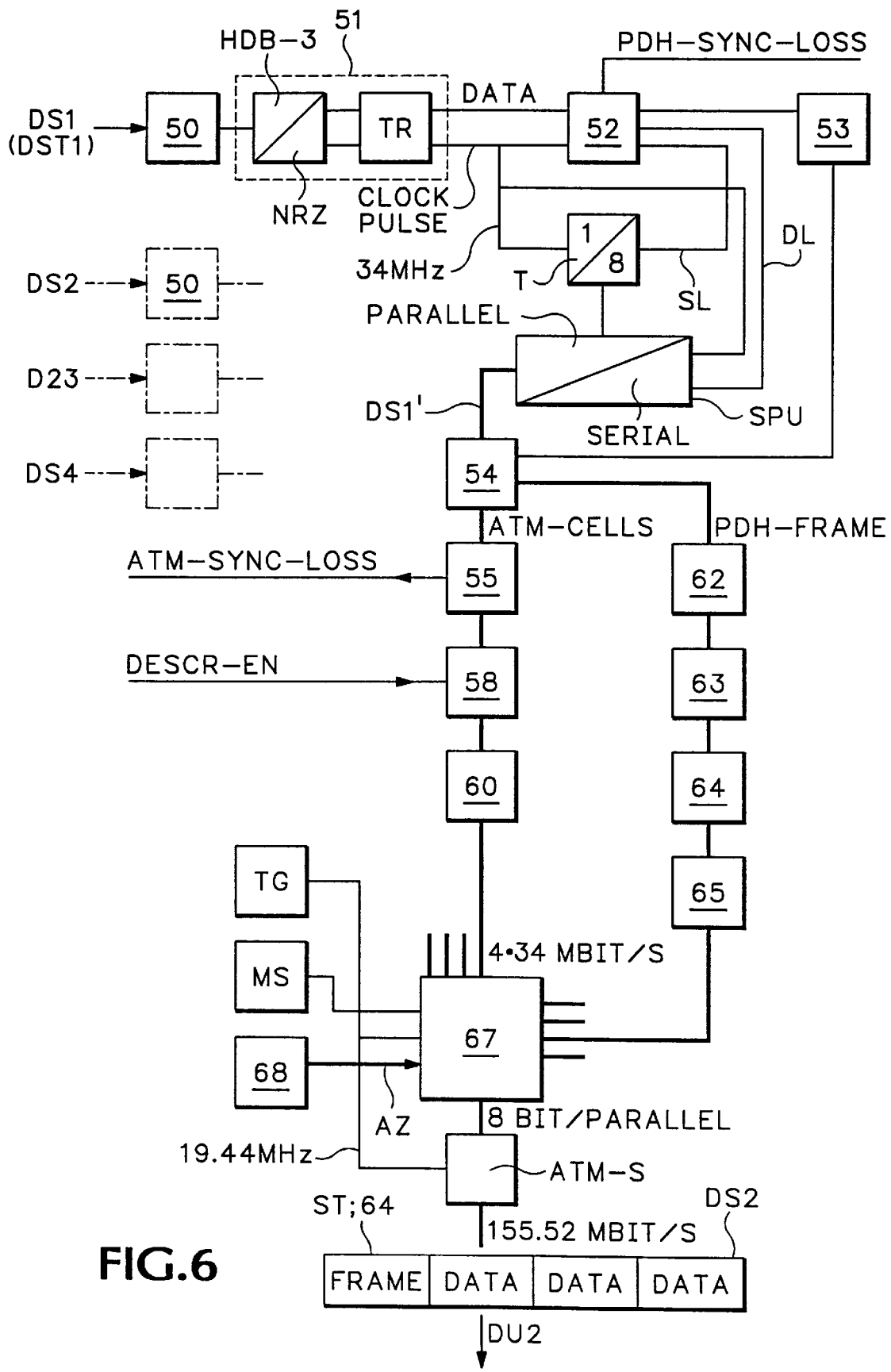
FIG. 6 and FIG. 7 illustrate, in detail, the functional sequence of conversions.

FIG. 6 illustrates the conversion of the data stream DS1 into a data stream DS2 for a data transmission system (measuring device) DÜ2 having a data rate of 155 mbit/s. The data stream DS1 arrives via a line adapter 50 to compensate for the frequency-dependent damping of the electrical input line at a decoder 51 for converting the line code (e.g., HDB-3 signal) used into the NRZ code (compare "Nachrichten-Meβtechnik" [Communication Measuring Technology]. E.Schuon/H.Wolf, Springer Publishers 1981, in particular page 237), with timing recovery TR for recovering the clock pulse of 34 MHz of the data stream DS1. The converted NRZ data and the recovered clock pulse are supplied separately to a frame-detection unit 52, while generating a loss signal PDH-sync-loss, as needed. When a frame identifier, which is contained in the structural data, is recognized, the frame detection unit 52 supplies a signal to a frame controller 53. Knowing the frame structure, the frame controller 53 can generate control signals, which render possible a differentiation of the data appearing on the output side at a serial/parallel converter SPU into data cells and structural data.

The frame detection unit 52 is synchronized by means of a synchronization line SL using a 1:8 divider (divisor) T to produce octet blocks. When the PDH frame identifier is recognized, the divider T is synchronized in such a way that the NRZ data are read in sequentially via a data line DL in accordance with clock pulse (34 MHz) into the converter SPU and read out in parallel by octets in accordance with the clock pulse divided by eight (34/8 MHz). In accordance with the previously known specification on frame formation (CCITT), a demultiplexer 54 controlled by the frame controller 53 separates the incoming data stream DS1' into ATM data cells (ATM cells) and structural data (denoted by PDH frame in FIG. 6). A cell synchronizer 55 synchronizes the ATM data cells coming from the demultiplexer 54 to the desired ATM data cell structure. By this means, information is obtained about the position (or state) of the data cell header. In the event of non-synchronization, a signal ATM-sync-loss is output. To the extent that they have been scrambled in advance - the ATM data cells can be descrambled by means of a descrambler 58, which is capable of being activated, as needed, by a signal descr-en, using the appropriate polynomial in accordance with CCITT. The ATM data cells are input into a FIFO cell memory 60, while being controlled by the cell synchronizer 55. In parallel to this, the structural data made available by the multiplexer 54 are input into a FIFO memory 62. A frame evaluator 63 checks the structural data, for example, for conformity to CCITT specifications. The test results and the structural data themselves are input into a structural cell 64 having an ATM cell format (ATM frame cell). The structural cell 64 is stored in a FIFO memory 65.

An ATM cell multiplexer 67 builds a second data stream DS2 for the data transmission system DÜ2 having 155 mbit/s through the corresponding retrieval of ATM data cells out of the cell memory 60 and of the structure cell out of the memory 65. By means of the synchronous multiplexing of altogether four of the above described circuit arrangements, which, on the input side, each receive a number n=4 of partial data streams DST1, DST2, DST3 and DST4 having a data rate of 34 mbit/s in each case, the structure cell ST specific to the partial-data stream and having an ATM cell format is inserted in each case into each useful area (capacity) of each PDH frame (i.e., a plurality of ATM data cells). As a result of the synchronous multiplexing, the original cell distribution in the respective PDH frame is retained, even in the event of a conversion into the data stream DS2, on the condition that each partial data stream DST1, DST2, DST3 and DST4 has access to only every fourth ATM data cell in the 155 mbit/s data stream DS2. This is guaranteed by means of the multiplexer 67, which receives a clock pulse of 19.44 MHz from a clock-pulse generator TG and is linked to a multiplexer controller MS. in conjunction with an idle-cell generator 68, which, for example, in accordance with the specific structure cell 64, feeds in a number of equalization cells AZ necessary for adapting the data rates for filling the unoccupied sections in the data stream DS2. Through the 8-bit parallel processing at 19.44 MHz, the data rate of 155 mbit/s (rounded-off) results. The thus formed second data stream DS2 (frame= ATM frame cell/structure cell; data=ATM data cell) can be directly routed to the interface ATM-S of the measuring device 42.

The merging of the structural data and/or measuring results by way of ATM data cells into the second data stream that is possible with the process according to the invention enables the contents of the PDH frame, the PDH frame and the measuring results to be recorded and further processed in a device suited for pure ATM data cell streams.

Figure 7:
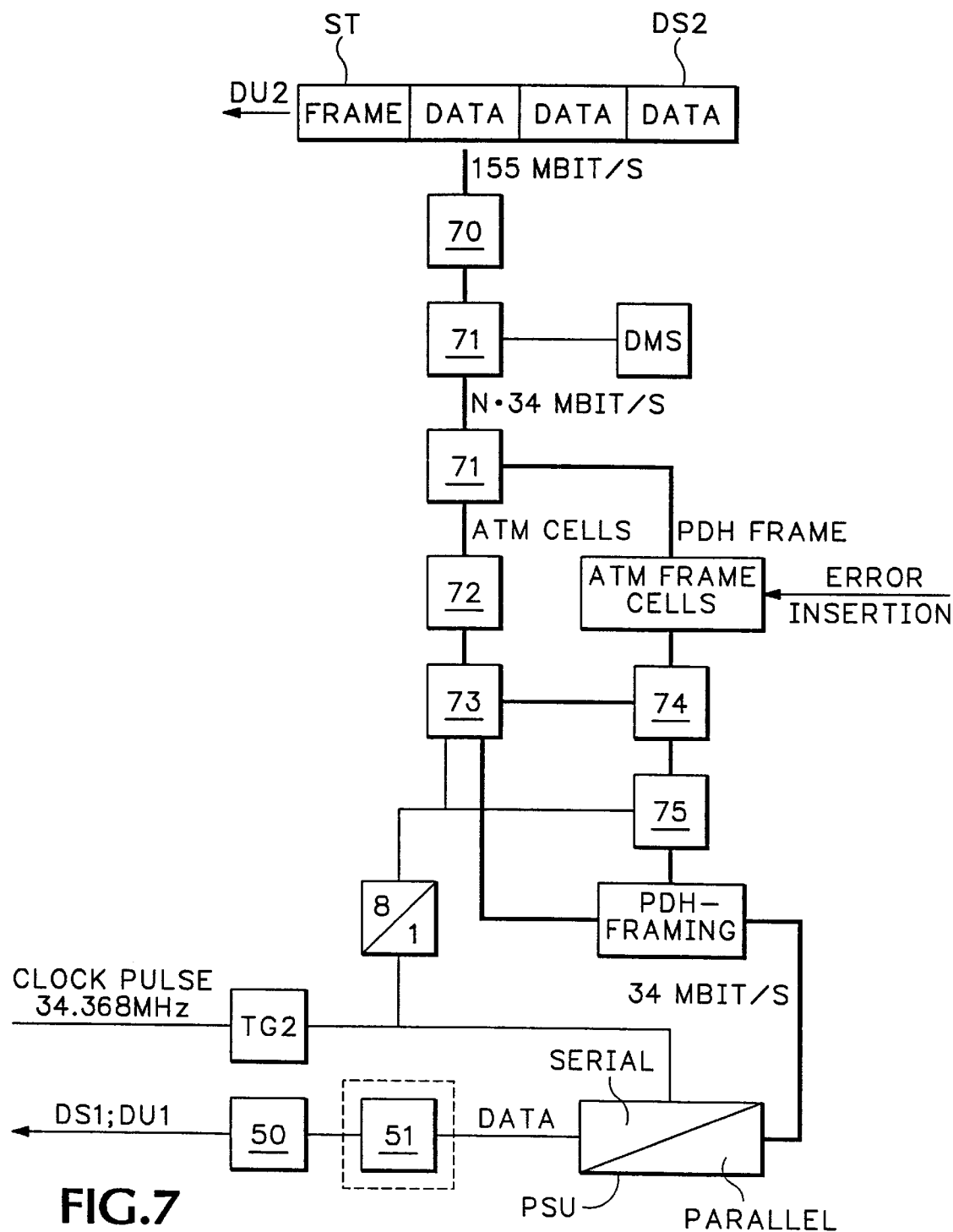

FIG. 7 essentially depicts a conversion path that is the reverse of that shown in FIG. 6, in the case of which the first data stream DS1 for the first data transmission system DÜ1 is formed with a first data transmission rate (data rate) of 34 mbit/s from the second data stream DS2 containing only ATM data cells for the second data transmission system DÜ2 having a second, higher data rate of 155 mbit/s (rounded off), while retaining the ATM data cell format. The second data stream DS2 contains structural data, which are input into a marked or markable structural cell ST, in the ATM cell format (ATM frame cell=frame). The structural cell is inserted in the second data stream DS2 for at least the partial filling of the unoccupied sections created as a result of the different data rates of 136 mbit/s (4×34 mbit/s) and 155 mbit/s. Oppositely to the manner depicted in FIG. 6, the ATM structural cells (frame) and the ATM data cells (data) from the second data stream DS2 are separated downstream from a parallel interface 70 by a cell-end multiplexer 71 linked to a controller DMS. The ATM data cells are preprocessed by means of a clocked scrambler 72 and an ATM cell memory 73 for the first data stream DS1. In parallel to this, the structural data for forming the PDH frame (ATM frame cell) are separated out of the structural cell. By means of a frame generator 74, errors can be selectively inserted into the structural data, for example, in order to check the reaction of a system to be measured.

The separated structural data are stored in a frame memory 75 and retrieved, as needed, to form the PDH frame (PDH framing) in accordance with the predetermined specification (CCITT). Therefore, in this variant of the process, data streams for transmission systems having a lower data rate (34 mbit/s) are produced from a second data stream DS2 having a higher data rate, depending upon the demultiplexing power n of the cell-end demultiplexer 72 (n*34 mbit/s). The function of the line adapter 50, of the decoder 51, of a parallel-serial converter PSU, of an 8:1 converter T2, and of a clock-pulse generator TG2 correspond to the functions described in connection with FIG. 6, the converter PSU generating serial data from the octets in an opposite manner.

FIG. 8 depicts the correlations among the data rates, as revealed by the CCITT recommendations for data rates for PDH systems and for pure ATM data cell systems. 2, 34 and 140 mbit/s are recommended for PDH systems, so that while conforming to the data rate of 155 mbit/s specified for pure ATM data cell systems, in each case multiplex or demultiplex factors of 70, 4 and 1 result.

FIG. 9 depicts the correlation between the allocation level $\phi$ of the ATM data cell memory 60 (FIG. 6) and the conversion time t. Without retrieving ATM data cells for the second data stream DS2, by inputting ATM data cells of the data stream DS1' (FIG. 6) with a data rate of 34 mbit/s, a selected beginning value $\phi_{MAX}$ is initially reached for the allocation level $\phi$, which can lie, for example, at ⅔ of the memory capacity. Memory systems, which exhibit an allocation level of ⅔ and ⅓, are standard commercial memory systems and can preferably be used for this purpose. In those periods, in which structural data appear and are input into the FIFO memory 62, the memory allocation of the ATM cell memory 60 remains constant (period B indicated only by dotted lines in FIG. 9). During the subsequent conversion (one continues to assume a 4:1 multiplexer, i.e. of 4 partial data streams DST1 through DST4 (FIG. 6), each with 34 mbit/s, and a second data stream DS2 with 155 mbit/s), the allocation level $\phi$ decreases in relation to the difference between the inputted ATM data cells and the outputted ATM data cells by −(155−34) mbit/s. The beginning memory allocation PMAX and the memory capacity are selected accordingly so that until insertion of the next structural cell and, in some instances, of additional equalization cells AZ, a permissible minimum allocation level $\phi_{MAX}$ is not undershot. After the next structural cells are inserted, equalization cells AZ are inserted into the second data stream, as needed, for so long until the allocation level $\phi$ again reaches at least the beginning memory allocation $\phi_{MAX}$. The equalization cells AZ can preferably be multiplied structural cells. It is also possible for the equalization cells AZ to be disposed between the structural cells, which makes them easy to detect.

As illustrated in FIG. 10, in the case of reverse conversion in accordance with FIG. 7, care must be taken to ensure that the beginning allocation level $\phi_{MIN}$ and the capacity of the other data cell memory 73 (FIG. 7) are rated to avoid exceeding a highest allocation level $\phi_{MAX}$. The highest allocation level $\phi_{MAX}$ is initially reached with a bit rate of 155 mbit/s without the simultaneous reading out of ATM data cells. During the subsequent reading out operation, the allocation level drops by 34 mbit/s. Due to the reading out operation that follows then in parallel, the allocation level rises during the next multiplex-controlled read-in duration by (155–34) mbit/s. During the time that the structural cells ST (FIG. 7) appear to form the PDH frame, the allocation level of the ATM cell memory 73 remains constant (period C).

We claim:

1. A process for converting digital data streams having an ATM cell structure, comprising steps of:

converting a first data stream for a first data transmission system having a first data transmission rate into a second data stream for a second data transmission system having a second data transmission rate which is higher than the first data transmission rate, while retaining a chronological sequence of ATM data cells of the first data stream, wherein the first data stream contains data cells in the ATM cell format and structural data, the structural data each assigned to a section including a plurality of ATM data cells and distributed according to a specified instruction in the first data stream, and wherein the second data stream contains only cells in the ATM cell format;

selecting the structural data from the first data stream;

inputting the selected structural data into a marked or markable structural cell having the ATM cell format, for the assigned section; and inserting the specific structural cell into the second data stream for at least partial filling of an unoccupied section, which is formed as a result of the different data rates.

2. The process according to claim 1, further comprising steps of:

evaluating the structural data in view of specifiable criteria, and inputting the evaluated structural data into the specific structural cell.

3. The process according to claim 1, further comprising a step of inputting the ATM data cells of the first data stream into a cell memory having a determined allocation level, wherein a minimum beginning allocation level is designed so that until a next structural cell is inserted into the second data stream, a permissible minimum allocation level is not undershot, and that, except for structural cells, equalization cells are inserted, as needed, into the second data stream until the allocation level again reaches at least the minimum beginning allocation level.

4. A process for converting digital data streams having an ATM cell structure, comprising steps of:

forming a first data stream for a first data transmission system having a first data transmission rate from a second data stream for a second data transmission system having a second data transmission rate which is higher than the first data transmission rate, while retaining the chronological sequence of ATM data cells of the second data stream, wherein;

the first data stream contains data cells in the ATM cell format and structural data, the structural data each assigned to a section including a plurality of ATM data cells and distributed according to a specified instruction in the first data stream, and wherein the second data stream contains only cells in the ATM cell format;

inputting the structural data for the first data stream, which is allocated in each case by sections, into marked or markable structural cells inserting said structural cells into the second data stream for at least partial filling of unoccupied sections created as a result of the different data rates; and retrieving the structural data from the structural cells and distributing the structural data in the first data stream in accordance with the specified instruction.

5. The process according to claim 4, further comprising a step of manipulating the data of the structural cells to selectively change the structural data.

6. The process according to claim 4, further comprising a step of inputting the ATM data cells of the second data stream into a cell memory wherein a beginning allocation level and the capacity of the cell memory are designed so that, until the next structural cell and/or possibly equalization cells appear in each case, a highest allocation level is avoided.

7. The process according to claim 1, wherein the first data stream is formed in a time-division multiplex comprised of a plurality of partial data streams a number of the partial data streams being calculated so that the sum of the data rates of the partial data streams, with the addition of each partial data stream of individually assigned structural cells, is smaller than or equal to the second data rate.

8. The process according to claim 1, wherein remaining unoccupied sections in the second data stream are filled by equalization cells which are formed by multiplying the specific structural cell.

9. The process according to claim 1, wherein the structural data represent a plesiochronous digital hierarchy (PDH) frame.

10. The process according to claim 2, further comprising a step of inputting the ATM data cells of the first data stream into a cell memory having a determined allocation level, wherein a minimum beginning allocation level is designed so that until a next structural cell is inserted into the second data stream, a permissible minimum allocation level is not undershot, and that, except for structural cells, equalization cells are inserted, as needed, into the second data stream until the allocation level again reaches at least the minimum beginning allocation level.

11. The process according to claim 5, further comprising a step of inputting the ATM data cells of the second data stream into a cell memory, wherein a beginning allocation level and the capacity of the cell memory are designed so that, until the next structural cell and/or possibly equalization cells appear in each case, a highest allocation level is avoided.

12. The process according to claim 4, wherein the first data stream is formed in a time-division multiplex comprised of a plurality of partial data streams a number of the partial data streams being calculated so that the sum of the data rates of the partial data streams, with the addition of each partial data stream of individually assigned structural cells, is smaller than or equal to the second data rate.

13. The process according to claim 4, wherein remaining unoccupied sections in the second data stream are filled by equalization cells which are formed by multiplying the specific structural cell.

14. The process according to claim 4, wherein the structural data represent a plesiochronous digital hierarchy (PDH) frame.

* * * * *